J. H. FREEMAN.
THROTTLE VALVE AND SLIP JOINT.
APPLICATION FILED SEPT. 15, 1909.

1,006,644.

Patented Oct. 24, 1911.

3 SHEETS—SHEET 1.

Witnesses:

Inventor:
John H. Freeman,
by His Atty.

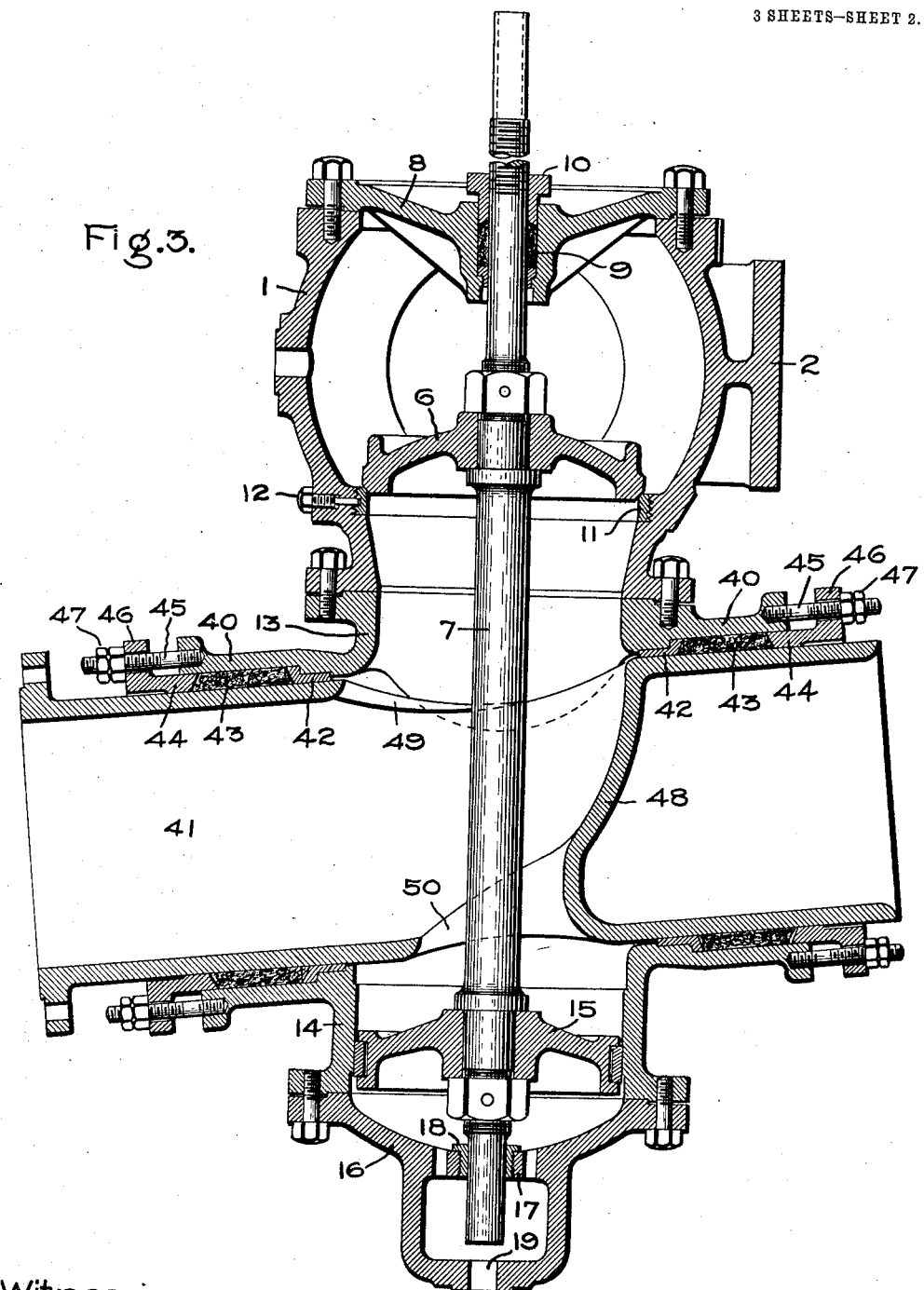

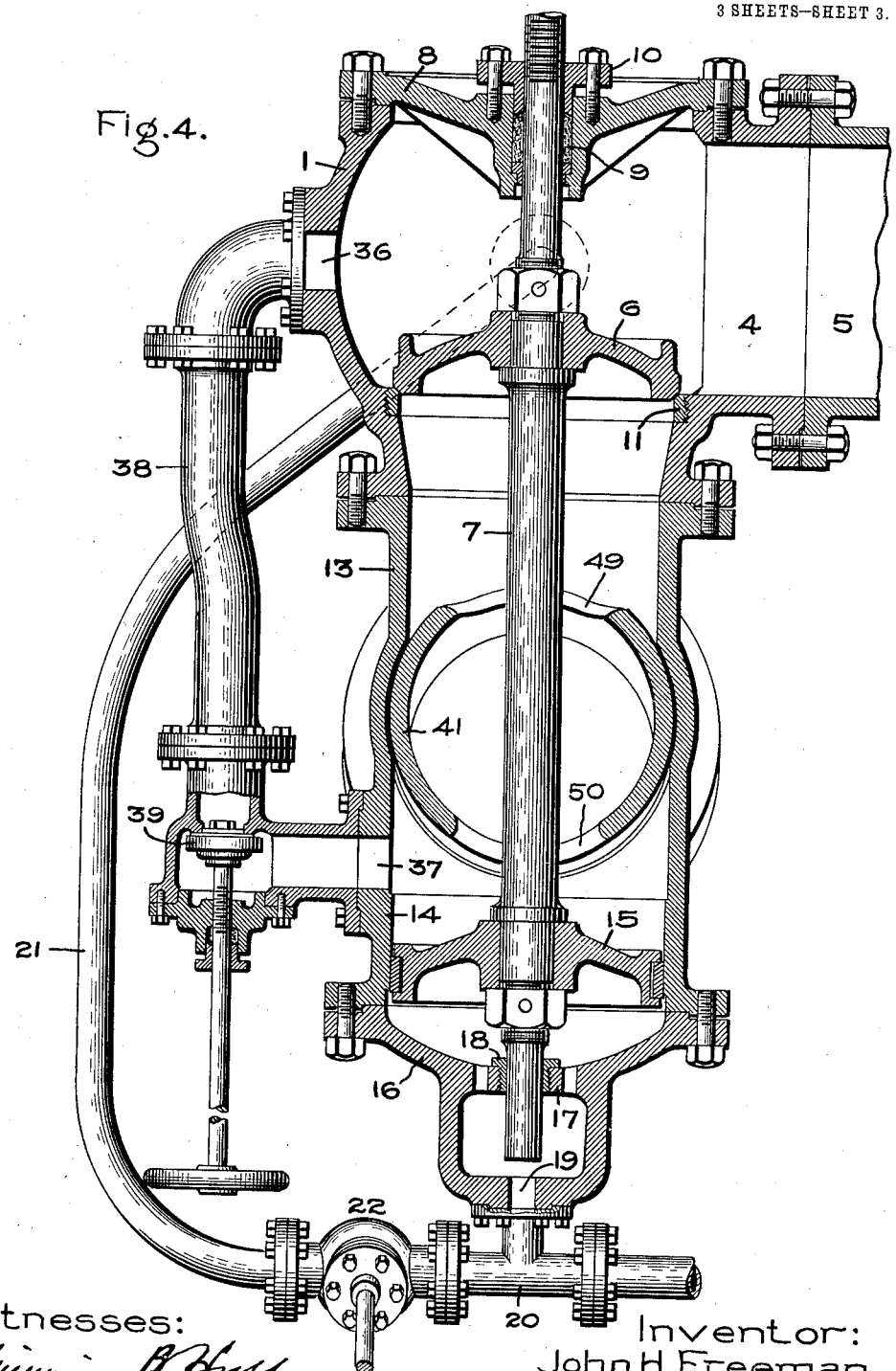

UNITED STATES PATENT OFFICE.

JOHN H. FREEMAN, OF WEYMOUTH HEIGHTS, MASSACHUSETTS, ASSIGNOR TO GENERAL ELECTRIC COMPANY, A CORPORATION OF NEW YORK.

THROTTLE-VALVE AND SLIP-JOINT.

1,006,644.     Specification of Letters Patent.     Patented Oct. 24, 1911.

Application filed September 15, 1909. Serial No. 517,825.

*To all whom it may concern:*

Be it known that I, JOHN H. FREEMAN, a citizen of the United States, residing at Weymouth Heights, county of Norfolk, State of Massachusetts, have invented certain new and useful Improvements in Throttle-Valves and Slip-Joints, of which the following is a specification.

This invention relates to steam engineering, and its object is to afford a convenient arrangement of piping and throttle valve for a steam main where provision must be made for the lengthening and shortening of the pipe, due to expansion and contraction or to other causes, without disturbing the throttle valve and its controlling and operating mechanism.

It frequently happens, especially in marine work, that the throttle valve must be solidly bolted to a supporting frame, and this is particularly the case with valves which control steam pipes a foot or more in diameter. It is manifestly necessary to operate such valves by gearing, and this must be so mounted on the frame supporting the valve as to be always in proper alinement and capable of easy manipulation. My invention enables this to be done in such a manner as to preclude any possibility of interference with such mechanism by the longitudinal movement of the main in which said valve is located.

The invention includes in one of its embodiments a valve having a body or casing provided with a transverse opening, in combination with a steam main passing through said opening and capable of a limited amount of longitudinal play therein without disturbing the steam-tight joint between said main and the valve casing.

The invention has been specially designed for a marine turbine of several thousand horse power, but is capable of use in many other situations.

Figure 1:
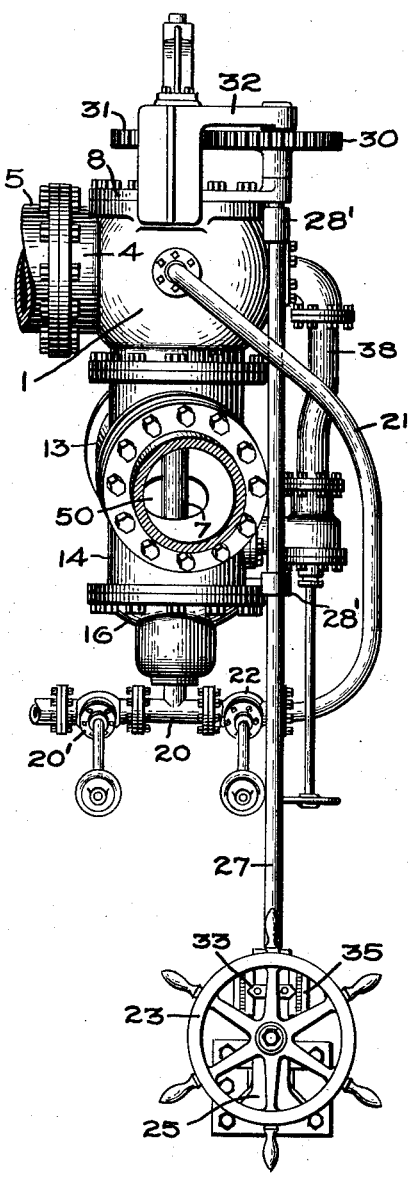
Figure 2:
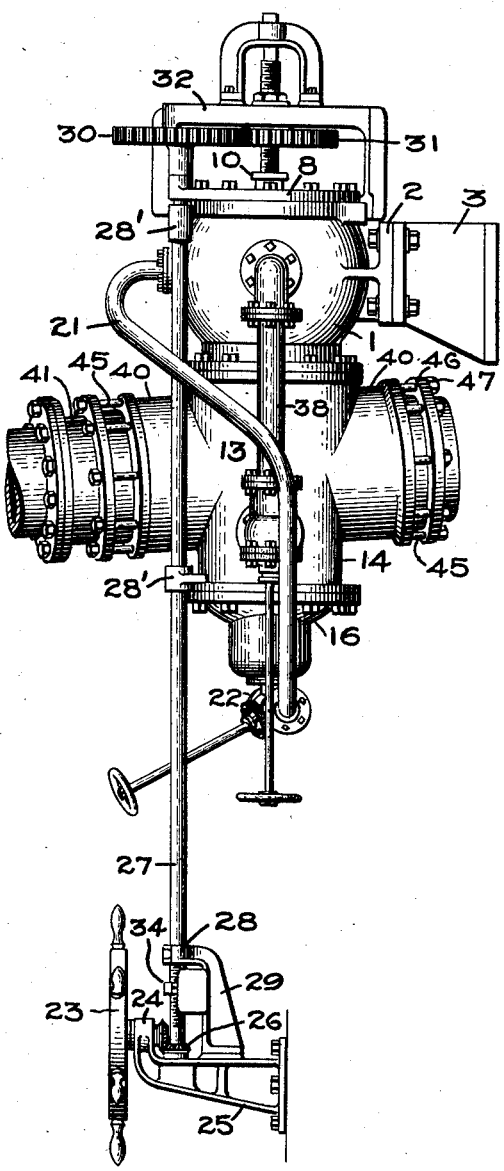

In the accompanying drawings, Figure 1 is a front elevation of a throttle valve and slip joint built in accordance with my invention; Fig. 2 is a side elevation of the same; Fig. 3 is an upright section in the plane of the valve and main; and Fig. 4 is an upright section through the valve transverse to the main.

The throttle valve shown is of the balanced type. It has a casing composed preferably of two parts one above the other, the upper part being the valve body and the lower the slip-joint body. The valve is housed in the valve body, while the balancing piston is located in the lower part of the slip-joint body; their common spindle passing centrally through both bodies.

The valve body 1 is provided with means, such as a pad 2, for enabling it to be secured to a support, such as a beam or bracket 3. At one side of the body is a flanged neck or portion 4 to which the supply main 5 is fastened. The valve 6 is of the puppet type, and is secured to a spindle 7 extending up through the cover or bonnet 8 of the casing, the joint being made steam-tight by packing 9 compressed by a gland 10. The seat for the valve is a ring 11 suitably secured in the lower opening of the valve body, being preferably screwed into place and locked by a screw bolt 12 inserted from the outside of the body, Fig. 3.

Securely bolted to the lower end of the valve body and concentric with the spindle is a tubular slip-joint body 13 having at its lower end a portion 14 bored out cylindrically to receive the balancing piston 15 which is secured to the lower part of the spindle. This end of the body is closed by a cover or bonnet 16 containing a bridge 17 in which is a guide-bearing 18 for the lower end of the spindle. A drain port 19 in the cover 16 provides for the escape of water of condensation and leakage steam working past the piston; a pipe 20 being provided for carrying off these products when the globe-valve 20', Fig. 1, is opened. Connected with the pipe 20 and leading from the live steam space above the main valve is a by-pass pipe 21 controlled by a globe valve 22. This by-pass is used when opening the main valve, admitting steam below the piston 15 and thereby counterbalancing to a great extent the pressure on top of the main valve; thus relieving the operator of the work of lifting more than the dead weight of the main valve, spindle or piston.

The gearing for handling the main valve consists preferably of a hand wheel 23 on a short shaft journaled in a bearing 24 at the end of a bracket 25, and geared by bevel gears 26 to an upright shaft 27 journaled in bearings 28 in the standard 29 rising from the bracket and also in bearings 28' on the slip-joint body and the valve body. At the upper end of this shaft is a gear wheel 30 meshing with a gear 31 which has a tubular hub journaled in a yoke 32 mounted on the top of the casing. This hub is screw-threaded internally to serve as a nut for the screw-threaded upper end of the spindle of the main valve. By turning the hand wheel 23 the spindle will be carried up or down and the valve will be opened or closed. The extent of opening is shown by an index 33 attached to a nut 34 engaging with screw-threads on the upright shaft 27 and moving over a stationary graduated scale 35 on the standard 29.

Extending from an opening 36, Fig. 4, in one side of the valve body to an opening 37 in the same side of the slip-joint body is a pipe 38 controlled by a stop-valve 39 and serving as a by-pass around the main valve. This is used for warming up the engine or for slow running.

The slip-joint body has cylindrical tubular projections 40 extending in opposite directions therefrom to receive the slip-joint section 41 of the steam main. The tubular projections are counterbored to accommodate the bushings 42 which fit the section 41 snugly and afford shoulders for the packing 43, which is confined by the glands 44. Screw-threaded studs 45 project from the ends of the projections through holes in flanges 46 on the glands, and nuts 47 on said studs enable the packing to be compressed to make steam-tight joints through which the section 41 can slip longitudinally. If it is desired to convey the steam in one direction only for said casing, one end of said pipe section is closed by suitable means, preferably a partition or septum 48 cast integral with the pipe section at a point preferably about in line with one side of the slip-joint body. The partition or septum 48 also serves as a means for balancing end thrust, the thrust at the opposite end of the piping connected to the section 41 being taken care of by the turbine itself or some bend or portion of said piping. The pipe-section is also provided with a large opening 49 in its upper side communicating with the interior of the valve casing to admit steam to said section. A smaller opening 50 is made in the lower side of the section 41 to let the spindle pass through, and to give the steam access to the top of the balancing piston.

It will be seen that this construction permits a free longitudinal movement of the pipe section 41 and the steam main of which it forms a portion in a direction transverse to the valve casing, but without disturbing the casing or the valve-handling gear.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a throttle valve, of a steam main extending transversely through the casing of said valve and longitudinally movable therein.

2. The combination with a valve and its casing of a main that extends transversely through and is movable in the casing, actuating means for the valve, slip joints for the main located on opposite sides of the axis of the valve, and means for supporting the casing in a fixed position.

3. The combination with a valve casing, of a valve spindle, valve and balancing piston, a pipe section extending across said casing between said valve and piston and capable of longitudinal movement.

4. The combination with a valve casing, of tubular projections extending in opposite directions therefrom below the valve seat, and affording means for making a slip joint with a pipe.

5. The combination with a valve casing having tubular projections extending in opposite directions therefrom below the valve seat, of a pipe section received in said projections having a septum extending across it at one side of said casing, and provided with an opening communicating with the interior of said casing.

6. The combination with a valve casing having counterbored cylindrical projections on opposite sides thereof, of a pipe section received in said projections, packing in said counter-bores, and means for closing one end of said pipe section.

7. The combination with a valve casing having cylindrical projections on opposite sides thereof, a valve seat above said projections and a cylindrical portion below the same, of a valve on said seat, a piston in the cylinder, a spindle for said valve and piston, and a pipe section slidable longitudinally in said projections and having openings for said spindle.

8. In combination, a casing, a valve located therein, a second casing attached to the first and containing a cylindrical chamber and transverse openings, a balancing piston located in said chamber, a spindle connecting it with the valve, a tubular pipe section mounted to slide in said openings and to which fluid is admitted by the valve, and means for opening and closing the valve.

9. In combination, a casing, a valve located therein, a second casing attached to the first and containing a cylindrical chamber and transverse openings, a balancing piston located in said chamber, a spindle connecting it with the valve, a tubular pipe section mounted to slide in said openings and closed at one end and open at the other, the said pipe section receiving fluid under the control of the valve and admitting it to one side of the piston, means for admitting high pressure fluid to the opposite side of the piston, and means acting through the spindle for opening and closing the valve.

10. In combination, a casing, a valve located therein, a second casing attached to the first and containing a cylindrical chamber and transverse openings, a balancing piston located in said chamber, a spindle connecting it with the valve, a tubular pipe section mounted to slide in said openings and to which fluid is admitted by the valve, a by-pass and its controlling valve used in balancing the main valve, a second by-pass and its valve for supplying fluid to said pipe section and the apparatus connected thereto, and means for actuating the valve through the spindle.

11. The combination with a valve and its casing of a main that extends transversely through and is movable in the casing, means for closing one end of the main, a balancing piston, a cylinder therefor, a stem for the valve and piston, and a by-pass for admitting fluid under pressure to the cylinder for balancing the pressure on the valve.

In witness whereof, I have hereunto set my hand this 13 day of September, 1909.

JOHN H. FREEMAN.

Witnesses:
F. L. Brake,
J. E. Fitzgerald, Jr.

Copies of this patent may be obtained for five cents each, by addressing the "Commissioner of Patents, Washington, D. C."